US008458956B2

(12) United States Patent
Hoermann

(10) Patent No.: US 8,458,956 B2
(45) Date of Patent: Jun. 11, 2013

(54) DOOR DRIVE HAVING TWO MOTORS

(75) Inventor: Michael Hoermann, Halle/Westphalia (DE)

(73) Assignee: Marantec Antriebs—und Steuerungstechnik GmbH & Co. KG, Marienfeld (DE)

( * ) Notice: Subject to any disclaimer, the term of this patent is extended or adjusted under 35 U.S.C. 154(b) by 386 days.

(21) Appl. No.: 12/716,630

(22) Filed: Mar. 3, 2010

(65) Prior Publication Data

US 2010/0223854 A1 Sep. 9, 2010

(30) Foreign Application Priority Data

Mar. 4, 2009 (DE) ..................... 20 2009 003 004 U
May 6, 2009 (DE) ..................... 20 2009 006 587 U

(51) Int. Cl.
*E05F 15/10* (2006.01)
*G05D 3/12* (2006.01)

(52) U.S. Cl.
USPC ........................................................ 49/199

(58) Field of Classification Search
USPC ............................ 49/197, 199; 160/188, 189
See application file for complete search history.

(56) References Cited

U.S. PATENT DOCUMENTS 4,248,016 A * 2/1981 Pecchioni ....................... 49/200
4,706,727 A * 11/1987 Leivenzon et al. ............ 160/188
4,819,376 A * 4/1989 Taddei ............................ 49/200
5,711,112 A * 1/1998 Barten et al. .................... 49/118
5,761,850 A * 6/1998 Lhotak et al. ................... 49/360
6,179,036 B1 * 1/2001 Harvey ......................... 160/188
6,485,225 B1 * 11/2002 Baker ................................ 404/6
6,497,267 B1 * 12/2002 Azar et al. .................... 160/310
6,633,094 B1 * 10/2003 Andou .......................... 307/326
6,845,804 B2 * 1/2005 Mullet .......................... 160/188
7,070,226 B2 * 7/2006 Cleland et al. ............. 296/146.8
7,373,756 B2 * 5/2008 Okulov et al. .................. 49/346
7,856,758 B2 * 12/2010 Ressel et al. .................... 49/358
7,878,931 B2 * 2/2011 Angiuli ......................... 474/167
2003/0015301 A1 * 1/2003 Killo et al. .................... 160/310
2003/0205338 A1 * 11/2003 Mullet et al. .................. 160/188
2005/0091928 A1 * 5/2005 Okulov et al. .................. 49/341
2006/0158145 A1 * 7/2006 Hormann ...................... 318/560
2006/0289128 A1 * 12/2006 Ressel et al. .................. 160/188
2007/0051045 A1 * 3/2007 Hoermann ...................... 49/199
2008/0119964 A1 * 5/2008 Hoermann .................... 700/302
2008/0163989 A1 7/2008 Sales et al.

FOREIGN PATENT DOCUMENTS

DE 1509753 6/1969
DE 4438851 5/1996
DE 29810132 10/1998
DE 29911291 9/1999
DE 69815205 4/2004

* cited by examiner

*Primary Examiner* — Katherine Mitchell
*Assistant Examiner* — Justin Rephann
(74) *Attorney, Agent, or Firm* — Dilworth & Barrese, LLP.

(57) ABSTRACT

The present invention relates to an apparatus for a door drive, in particular for roller doors, sectional doors or the like, having a door movement element, in particular a door shaft, for the opening and closing of a door and a connection means arranged at the door movement element. In accordance with the invention, the door drive includes at least two electric motors of which one is indirectly/directly fixedly connected to the connection means arranged at the door movement element and all further electric motors are arranged radially movably around the door movement element and are connected thereto via the arranged connection means.

20 Claims, 5 Drawing Sheets

DOOR DRIVE HAVING TWO MOTORS

BACKGROUND OF THE INVENTION

The present invention relates to a door drive, in particular for sectional doors, swing doors, sliding doors or the like, having a door movement element, In particular a door shaft, for the opening and closing of a door and a connection means arranged at the door movement element.

Electric motors which drive a door movement element, typically a door shaft, in order to wind up a door cable or a door chain to which the door is fastened are used as a rule to drive doors such as garage doors, garden doors or gates, hall or hangar doors or also large industrial doors or gates. It is understood that other door movement elements can be used in this respect.

Large, particularly powerful electric motors which have a high torque, in particular have to be used for large industrial doors or gates. In conjunction with the growing demands on such a drive unit, the production costs of such a door drive of the prior art naturally also increase.

SUMMARY OF THE INVENTION

It is therefore the underlying object of the invention to provide a more inexpensive possibility to drive a door. In particular a further development of a door drive in accordance with the prior art should be achieved with simple means.

This object is solved in accordance with the invention by a door drive in accordance with the description herein. Preferred embodiments of the invention are the subject of the description herein.

An apparatus for a door drive is therefore proposed, in particular for a sectional door, a roller door or the like, having a door movement element, in particular a door shaft, for the opening and closing of a door, and a connection means arranged at the door movement element, with the door drive including at least two electric motors of which one is indirectly/directly fixedly connected to the connection means arranged at the door movement element (2) and all further electric motors (3, 4) are arranged radially movably around the door movement element and are connected thereto via the arranged connection means. The torques of the individual electric motors can be transferred to the door movement element via the respective connection means and a rotary movement about the axis of rotation of the door movement element can thus be achieved, which results in an opening and closing procedure of the door drive. It is important in this respect that the driving torques of the individual electric motors do not act opposite to one another, but rather with one another. A large, expensive unit can thereby be replaced by two smaller or more inexpensive standard electric motors. In particular with a roller door, a roller grille can be arranged at the door shaft so that the roller grille is wound up or unwound on a rotary movement about the longitudinal axis in a clockwise or anticlockwise direction. The winding movement is generated by the electric motors which are connected via connection means flanged to the motor output shaft to the connection means arranged at the door shaft whose torques are in the same direction and set the door shaft into the corresponding rotating movement.

The problem results by the use of more than one electric motor for the driving of a door drive that the speeds of rotation of the electric motors used have to be operated synchronously with one another. If the rotational speed of the individual motors varies even only minimally, this can result in friction points or increased material strain of specific drive components and can effect accelerated wear. Such asynchronous rotational speeds of the motors are due to minimal differences of the transformers of the same construction type for the supply of the electric motors. Even very small power differences of the individual motors of the same construction type can result in different rotational speeds.

To prevent or alleviate the named concomitant phenomena, all further electric motors are arranged radially movably about the door movement element, whereby transformer and motor differences and thus an asynchronous operation of the at least two electric motors can be compensated. If the speeds of rotation or the drive speeds of the at least two electric motors run apart, i.e. asynchronously, an ideal power transfer is no longer ensured and additional friction points arise at different sites of the connection means of the door drive. Such additionally occurring friction points can be compensated by the movable arrangement of the further electric motors used with asynchronous drive speeds of the motors and the unimpeded power transfer of the individual motors to the door movement element can be ensured.

It can be of advantage in this respect if the connection means flanged to the motor output shafts include drive pinions which engage into a suitable connection element arranged at the door movement element and which set the door movement element into motion via it. The connection means arranged at the door movement element is, for example, a chain or a further gear arranged on the door movement element. The drive pinions engage into the chain or into the gear and set the door movement element into a predetermined rotating movement via the chain.

It is conceivable that at least one transformer is provided in the door drive which is connected to at least one or all electric motors such that the required supply voltage for the electric motors can be provided. The transformer can, for example, transform the AC voltage applied to the input to a required effective value and can generate a DC current at the output by a rectifier connected downstream.

At least one electric motor advantageously includes a DC motor. DC motors can be controlled via a comparatively simple circuit design of a control. A simplified control of a DC motor with respect to known AC motors thereby results since the required frequency converters for the operation of a regulated AC motor can be dispensed with. As a rule, such known DC motors have very high output speeds of rotation.

It can be of advantage for this purpose if at least one electric motor includes a geared motor. In this respect, a geared motor has a motor unit with a downstream small transmission in its geared motor housing. With DC geared motors, the high output speed of rotation can be transformed down by the transmission and a higher output torque with a smaller speed of rotation arises at the output of the motor.

In a further advantageous manner, at least one control variable, in particular a door position signal, can be detected by a suitable means at the door drive and the control variable serves the control of the supply voltage of at least one electric motor. The control variable can be operated in simplified terms via the function:

$$U=f(s)$$

where s can stand, for example, for the respective door position and $f(s)$ is a predefined function for the calculation of a voltage U for the control of at least one electric motor. In this respect, the speed or the speed of rotation of the respective connected electric motor can be controlled by the voltage U.

The door position signal, for example, indicates the respective opened position of the door used and effects a braking, stopping or acceleration of the door drive.

Provision is made in an embodiment variant that at least two transformers supply the at least two electric motors with a required supply voltage. In this respect, a respective transformer is connected to a respective electric motor and supplies it with a required supply voltage for the operation of the electric motor.

The problem results by the use of more than one electric motor for the driving of a door drive that the speeds of rotation of the electric motors used have to be operated synchronously with one another if the rotational speed of the individual motors varies even only minimally, this can result in friction points or increased material strain of specific drive components and can effect accelerated wear. Such asynchronous rotational speeds of the motors are due to minimal differences of the transformers of the same construction type used for the supply of the electric motors. Even very small power differences of the individual motors of the same construction type can result in different rotational speeds.

To prevent or alleviate the named concomitant phenomena, at least one motor is advantageously arranged or supported resiliently via at least one spring at the door drive, whereby transformer and motor differences and thus an asynchronous operation of the two electric motors can be compensated. The at least two motors are connected to the door movement element via the connection means so that their output torques produce a drive of the door element. The connection is configured in this respect such that an ideal force transfer can be achieved. If the speeds of rotation or drive speeds run apart, i.e. asynchronously, an ideal force transfer is no longer ensured and additional friction points arise at specific sites of the connection means of the door drive. Such additionally occurring friction points can be compensated by the resilient support or arrangement of at least one electric motor with asynchronous drive speeds of the motors and the unimpeded force transfer of the individual motors to the door movement element can be ensured.

It is also conceivable that at least two incremental encoders are arranged at the at least two electric motors and a regulation value for the regulation of at least one electric motor can be determined with reference to the measured values detected by the incremental encoders. Sensors for the detection of position changes which can detect both the path distance and the path direction are called incremental encoders. The path covered by each individual electric motor can be determined by the arrangement of a respective incremental encoder at a respective electric motor and can thus be used for an evaluation of the rotational speed of the individual electric motors. Deviations of the electric motors from a mutually synchronous operation can be determined by a suitable signal evaluation and at least one electric motor can be regulated by means of the regulation value such that the operation of the individual electric motors again takes place mutually synchronously. The regulation value in this respect influences the supply voltage of at least one electric motor such that its rotational speed can be matched to the rotational speed of the other electric motors used. It is conceivable in this respect that not only one electric motor can be regulated via the detected regulation value, but rather that a regulation of a plurality of electric motors takes place with reference to the regulation value.

A possibility for the evaluation of the aforesaid measured values is characterized in that the regulation value can be determined by comparison or by addition of the named measured values of the incremental encoders and at least one electric motor can be regulated by means of this regulation value. In this respect, the addition or the comparison of the measured values can be carried out via suitable connected operational amplifiers.

A further possibility to recognize an asynchronous operation of the electric motors is that the door drive provides at least one measurement apparatus for the measurement of the angular position of at least one electric motor arranged at the door drive. In this respect, the angular position of the electric motor to the door movement element itself or the angular position of the connection means flanged to the motor output can be measured, for example. The angular position changes of the corresponding electric motor or connection means caused by an asynchronous operation of the at least two electric motors can be detected by the measurement apparatus and a suitable regulation value can thereby be generated for the regulation of at least one electric motor and a synchronous operation of the electric motors can thus be set.

The door drive advantageously provides at least one rheostat which is arranged such that the supply voltage can be varied directly by the rheostat at at least one electric motor. In this respect, it is not a signal which is evaluated, but rather the applied supply voltage can be varied directly via the rheostat at the respective electric motor and a synchronous operation of the individual electric motors with respect to one another can thus be set.

In a further advantageous manner, the door drive provides a control for the evaluation and control of the control variables and/or regulation values. The control processes and evaluates the measured measurement values to realize a control of the at least two electric motors to the effect that a synchronous operation of the at least two electric motors with one another is ensured:

BRIEF DESCRIPTION OF THE DRAWINGS

The present invention should now be explained in more detail with reference to embodiments and to drawings. There are shown.

DESCRIPTION OF THE PREFERRED EMBODIMENTS

Figure 1:
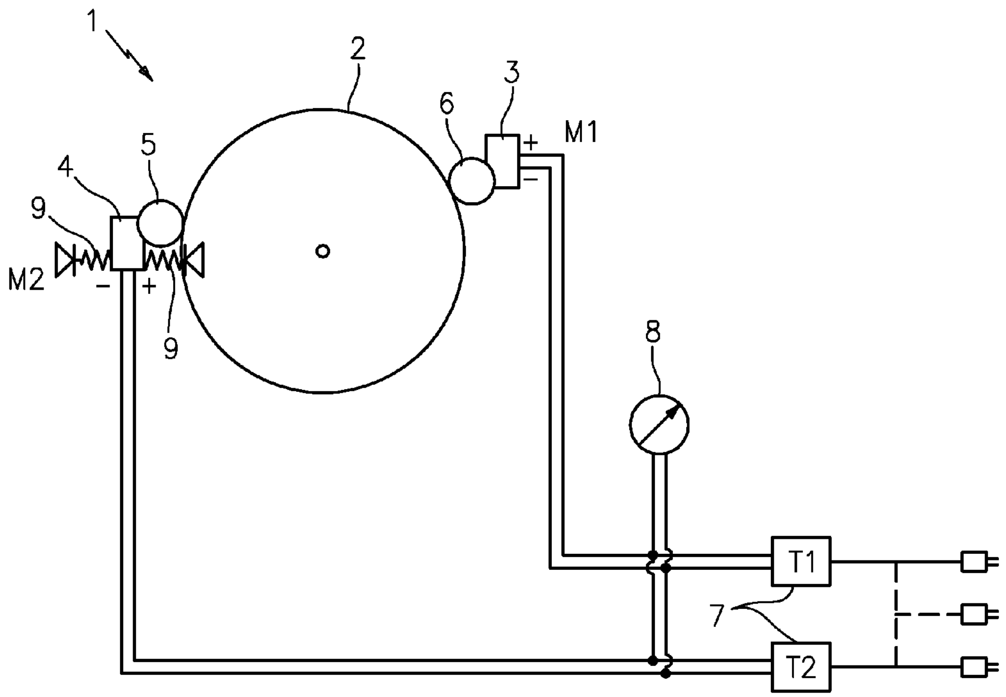
FIG. 1: a circuit diagram of a first embodiment of the door drive in accordance with the invention.
Figure 2:
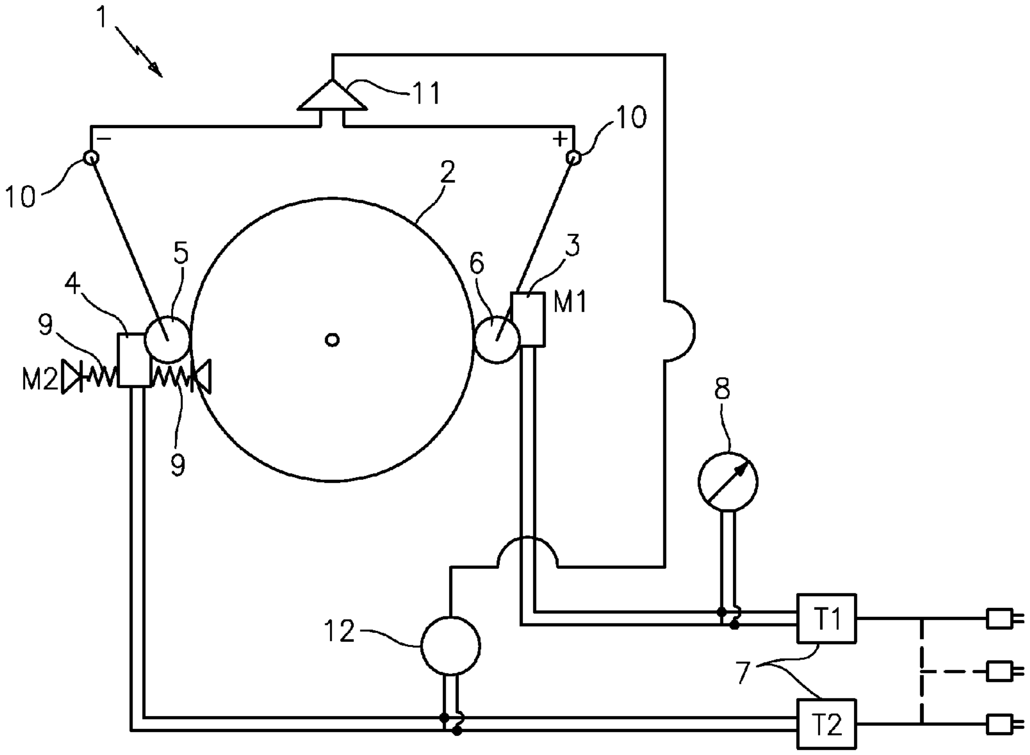
FIG. 2: a circuit diagram of a second embodiment of the door drive in accordance with the invention.

A first embodiment of the door drive 1 in accordance with the invention is shown in FIG. 1. The door drive 1 shown includes a door movement element 2 which is designed as a door shaft in the embodiments of FIGS. 1 to 4. The door shaft 2 is rotatable about is longitudinal axis, whereby a door, not shown here, in particular a sectional door, door grille/roller door, arranged at the door shaft 2, can be rolled up and down.

In accordance with the invention, the door drive 1 has two electric motors 3, 4 whose rectified drive torques complement one another to form a greater total torque overall. The use of an individual, powerful motor unit can thereby be dispensed with and costs can be saved by the use of two smaller motor units.

Both electric motors transfer their output forces via a connection means in the form of a drive pinion 5, 6 to a connection means arranged at the door shaft, but not shown in any more detail in FIGS. 1 to 4, and thereby to the door shaft. The connection means, which is not shown in any more detail, can in this connection be a further gear which is seated on the door shaft and whose toothed arrangement engages into the teeth of the drive pinion of the two electric motors. A chain or other means for the force transfer to the door shaft is, however, likewise also conceivable.

The two electric motors 3, 4 used are two identical DC geared motors which are fed in each case via a transfer 7 with a predefined supply voltage. The transformers 7 are likewise models of the same type with identical performance properties. It can be seen from FIG. 1 that separate supply systems are defined for the two electric motors 3, 4. A door control signal can be detected by a suitable measurement apparatus and it can be evaluated by a control. The control outputs a control variable 8 which serves for the regulation of the supply voltage of the two electric motors 3, 4 from FIG. 1. The speed at which the two electric motors 3, 4 rotate can be varied with reference to the supply voltage. In simplified terms, the control variable output by the control is defined from a function which calculates a required output voltage for the feeding of the electric motors 3, 4 in dependence on the path, i.e. in dependence on the set position of the door s:

$$U=f(s).$$

In the embodiment of the door drive 1 in accordance with the invention in FIG. 1, both the supply voltages feeding the electric motors 3, 4 are regulated by means of the control variable 8.

Since minimal differences in the performance properties also result in the use of identical electric motors 3, 4 and transformers 7 and since this results in a slightly asynchronous operation of the two electric motors, an electric motor 4 is arranged via springs 9 at the door drive. The springs in this connection help compensate growing strains and friction points of the gears by pressure relief of the electric motor 4 in the direction of the door shaft 2 by means of the springs 9.

In a further embodiment (FIG. 2) of the door drive 1 in accordance with the invention, in addition to the compensation of the transformer and motor differences by means of springs 9, a respective incremental encoder 10 is arranged in direct proximity to the electric motors 3, 4 such that the movement path covered by the drive pinions 5, 6 can be detected in a technical measurement. The outputs are in this respect connected to a suitable evaluation apparatus 11 which either compares the two signal inputs with one another or adds them to one another. The use of a comparator for the comparison or of an operational amplifier for the addition of the two output signals of the incremental encoders 10 is conceivable.

The output of the evaluation apparatus 11 is in this respect connected to the feedback loop of the electric motor 4. A regulation value 12 is generated in dependence on the applied signal at the output of the evaluation apparatus 11 which triggers a regulation of the rotational speed of the electric motor 4 to counter an advancing or a lagging of the electric motor 4 in comparison with the electric motor 3. It becomes clear in this respect that two separately regulatable regulation control circuits are present in the embodiment of the door drive 1 in accordance with the invention in FIG. 2. It must additionally be noted that all further components or properties of the embodiment of FIG. 2 coincide with those of FIG. 1.

Figure 3:
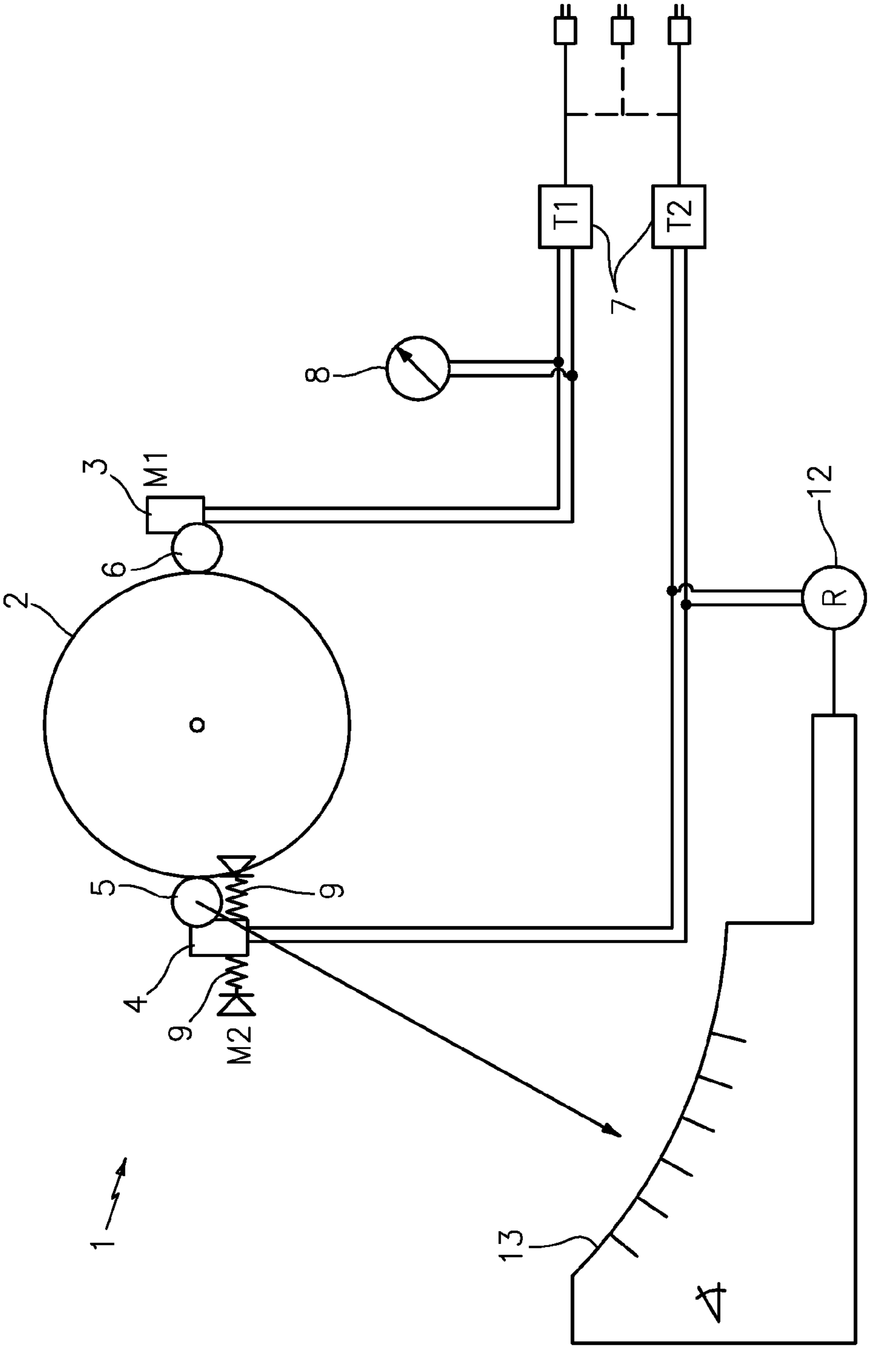
FIG. 3: a circuit diagram of a third embodiment of the door drive in accordance with the invention.

A third embodiment possibility of the door drive 1 in accordance with the invention is shown in FIG. 3. The door drive 1 in turn comprises a door shaft 2 which is driven via two drive pinions 5, 6 flanged to the motor output of the electric motors 3, 4. Both electric motors 3, 4 of the same construction are fed with a predefined supply voltage via transformers 7 of identical constructional types. A regulation value 8 is determined by a suitable door setting measurement unit for the regulation of the rotational speed of the first electric motor 3. For the regulation of the separately regulatable second regulation circuit by the second electric motor 4, the angular position of the electric motor 4 is detected in a technical measurement and a regulation value 12 can be generated by means of the value detected. Minimal malpositions in the mutual engagement of the teeth of the drive pinion 5 into the teeth of the gear arranged on the door shaft and thus increasing friction points can be compensated by the resilient arrangement of the electric motor 4 by means of the springs 9. A changed angular position of the motor 4 can thereby occur which is recognized by the measurement apparatus 13 in a technical measurement and which is compensated by the regulation value 12. In this respect, the regulation value 12 regulates the supply voltage of the electric motor 4 such that its rotational speed is matched to that of the electric motor 3 and a precise mutual engaging of the named gears is again made possible.

Figure 4:
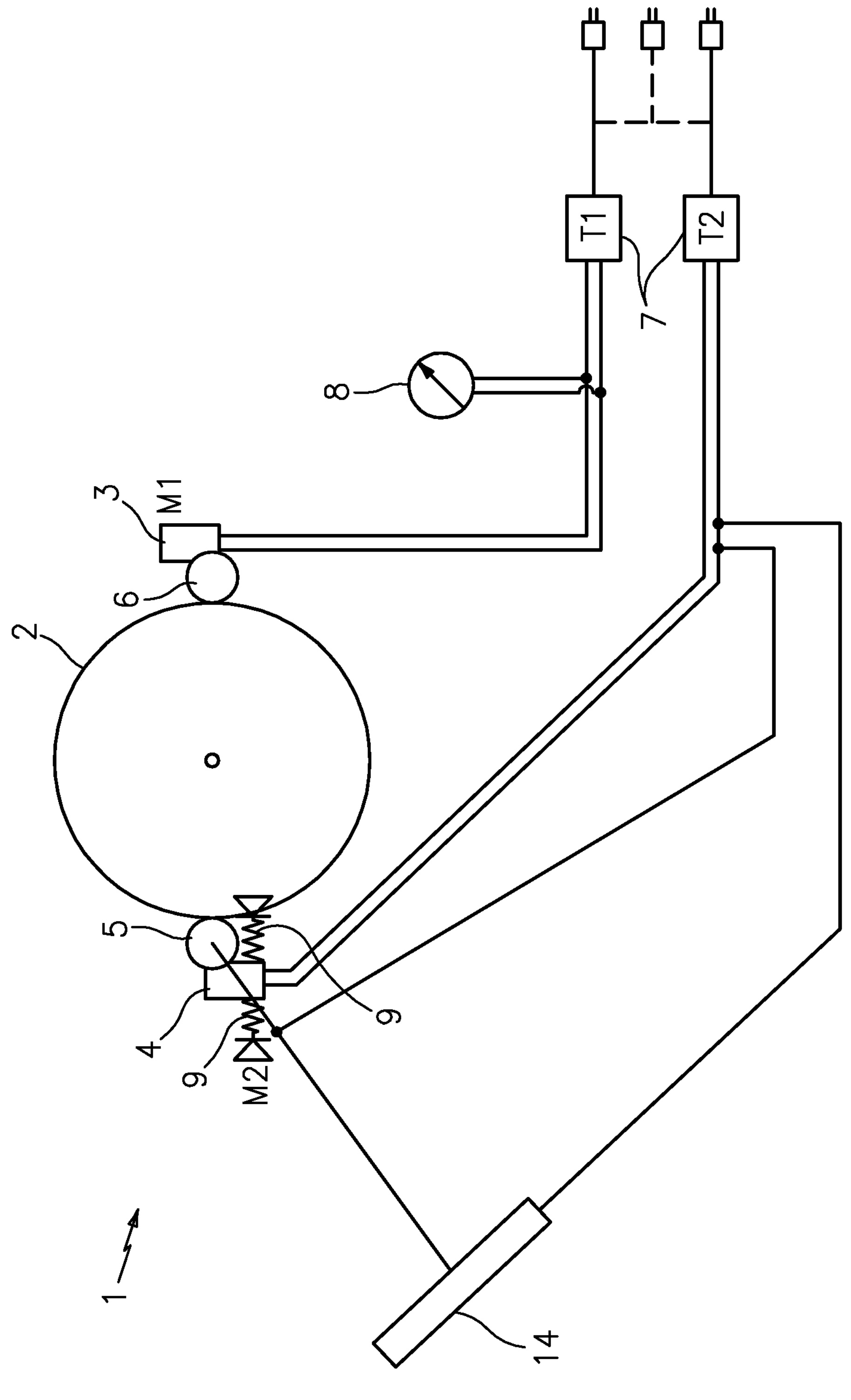
FIG. 4: a circuit diagram of a fourth embodiment of the door drive in accordance with the invention.
Figure 5:
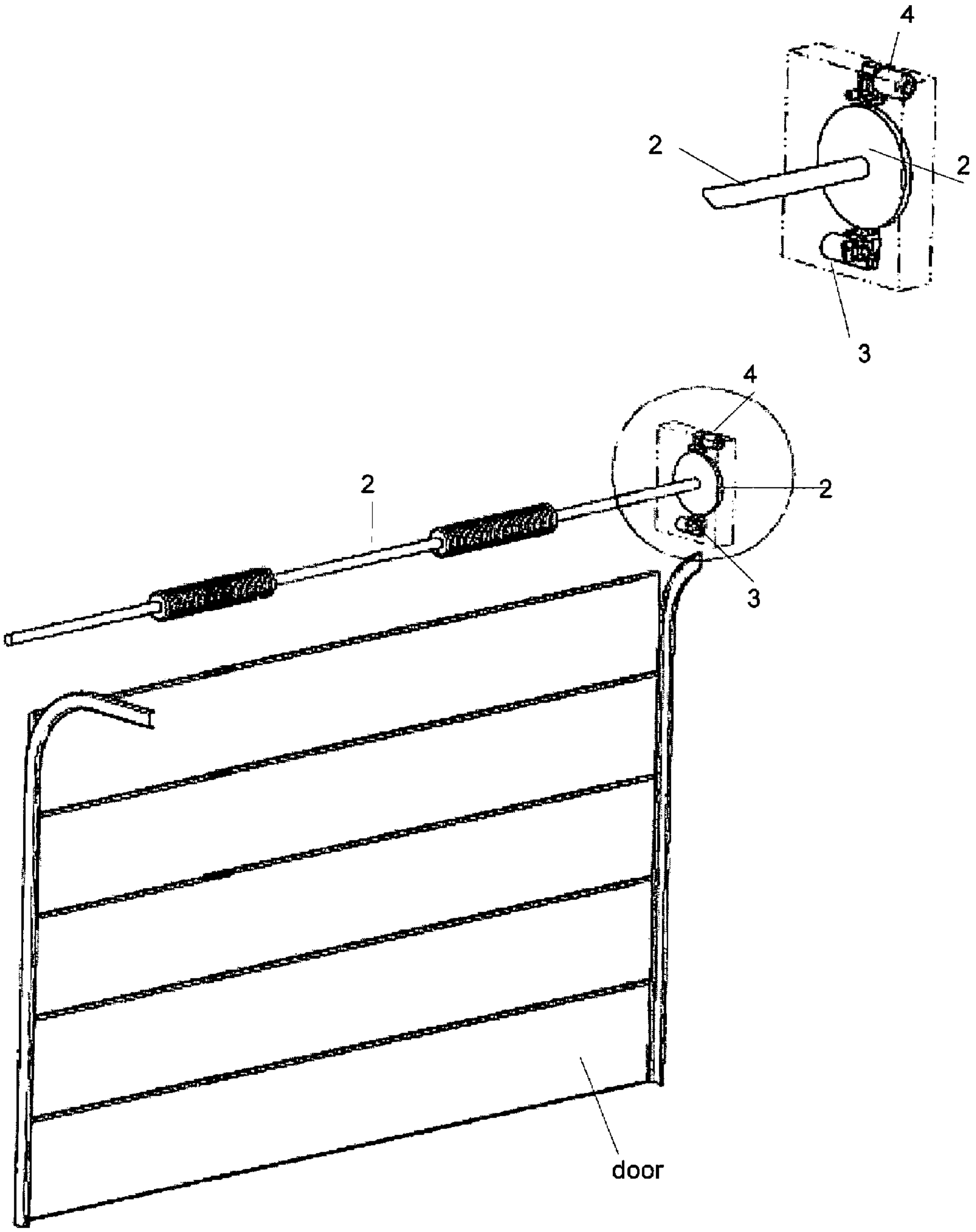
FIG. 5: a diagram illustrating the door and the door drive in accordance with the invention.
Figure 6:
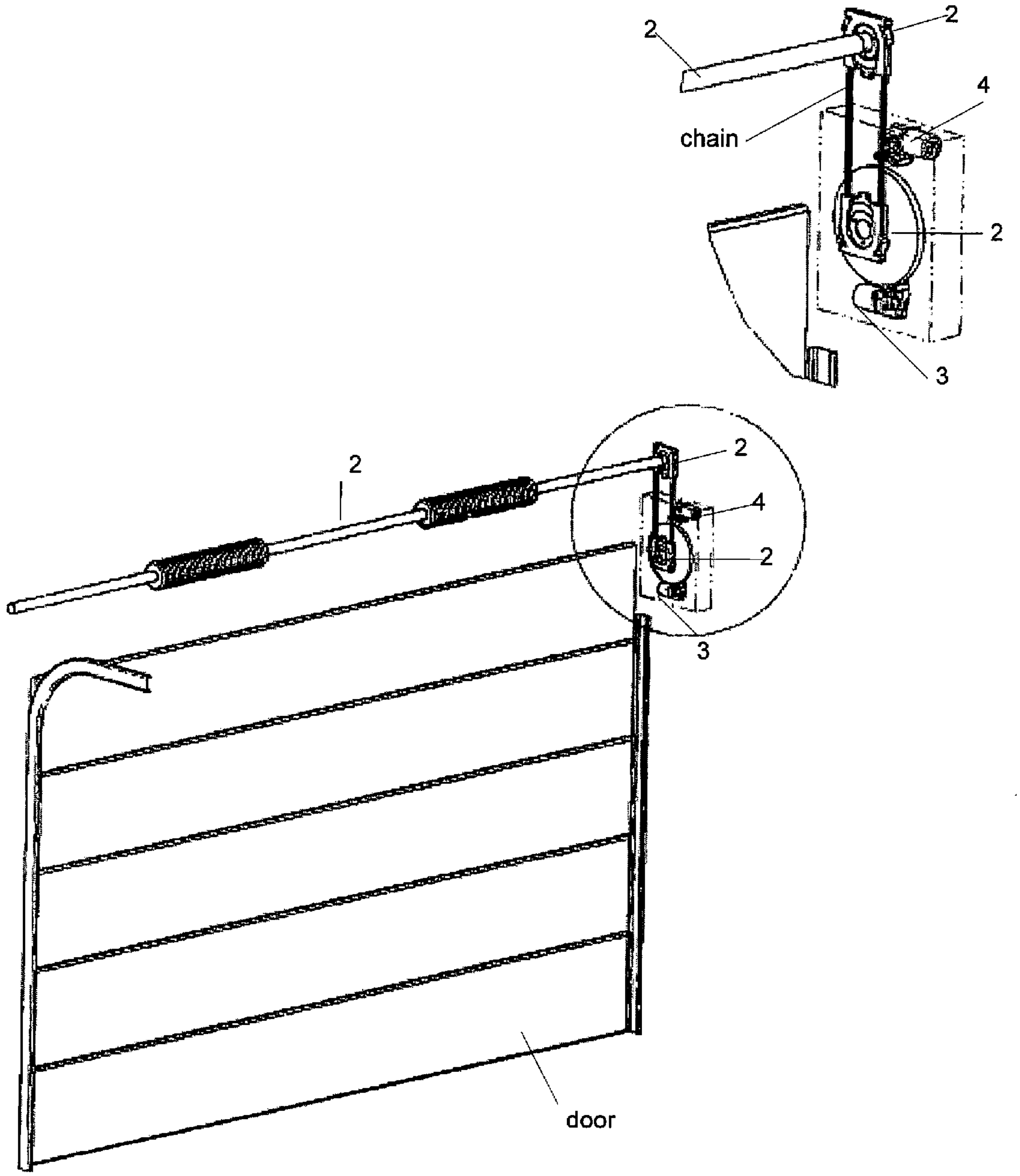
FIG. 6: a diagram illustrating another embodiment of the door and the door drive in accordance with the invention.

FIG. 4 shows a further embodiment of the door drive 12 in accordance with the invention. The design of the door drive is identical to the design of FIG. 3 with the exception of the measuring apparatus 13 and the regulation value 12. Instead of the named measurement apparatus 13, a rheostat 14 is used which is arranged at the electric motor 4 such that the electrical ohmic resistance of the rheostat changes on minimal positional changes or delay angle changes of the electric motor 4 due to the running apart of the teeth of the drive pinion 5 and of the gear arranged on the door shaft 2. The supply voltage is changed directly at the input of the electric motor 4 by the rheostat 14 by the connection of the rheostat 14 in the regulation circuit of the electric motor 4 and the generated change in the electrical ohmic resistance. The tracking electric motor 4 can be influenced by a suitable dimensioning of the rheostat to the extent that a synchronous operation of the two electric motors 3, 4 is ensured.

The invention claimed is:

1. An apparatus for a door drive (1), having a door movement element (2) for the opening and closing of a door and at least one connection means arranged at the door movement element (2), wherein the door drive (1) includes at least two electric motors (3, 4), each having one of said at least one connection means associated therewith, wherein one of said at least two electric motors is fixedly connected to its respective connection means arranged at the door movement element (2) and all further electric motors (3, 4) are mounted via springs to enable radial movement with respect to the door movement element and are connected to the door movement element via their respective connection means.

2. An apparatus for a door drive (1) in accordance with claim 1, wherein the at least two electric motors can be connected to the connection means arranged at the door movement element (2) of the door drive (1) via corresponding connection means (5, 6) arranged at the motor output shaft.

3. An apparatus for a door drive (1) in accordance with claim 2, wherein the corresponding connection means (5, 6) include drive pinions which are flanged to the motor outputs; and wherein the connection means is a chain and the drive pinions engage into the chain, arranged at the door movement element (2) for the drive of the door movement element (2) of the door drive (1).

4. An apparatus for a door drive (1) in accordance with claim 3, wherein at least one transformer (7) is provided in the door drive (1), wherein the at least one transformer is connected to at least one or all electric motors (3, 4) and which provides the required supply voltage of the electric motors (3, 4).

5. An apparatus for a door drive (1) in accordance with claim 4, wherein at least one electric motor (3, 4) includes a DC motor.

6. An apparatus for a door drive (1) in accordance with claim 3, wherein at least one electric motor (3, 4) includes a DC motor.

7. An apparatus for a door drive (1) in accordance with claim 2, wherein at least one transformer (7) is provided in the door drive (1), wherein the at least one transformer is connected to at least one or all electric motors (3, 4) and which provides the required supply voltage of the electric motors (3, 4).

8. An apparatus for a door drive (1) in accordance with claim 7, wherein at least one electric motor (3, 4) includes a DC motor.

9. An apparatus for a door drive (1) in accordance with claim 1, wherein at least one transformer (7) is provided in the door drive (1), wherein the at least one transformer is connected to at least one or all electric motors (3, 4) and which provides the required supply voltage of the electric motors (3, 4).

10. An apparatus for a door drive (1) in accordance with claim 9, wherein at least one electric motor (3, 4) includes a DC motor.

11. An apparatus for a door drive (1) in accordance with claim 1, wherein at least one electric motor (3, 4) includes a DC motor.

12. An apparatus for a door drive (1) in accordance with claim 1, wherein at least one electric motor (3, 4) includes a geared motor.

13. An apparatus for a door drive (1) in accordance with claim 1, wherein at least one control variable (8) and a door position signal are detectable by the door drive, and wherein the control variable (8) is used to control a supply voltage of at least one electric motor (3, 4).

14. An apparatus for a door drive (1) in accordance with claim 1, wherein at least two transformers (7) regulate at least two electric motors (3, 4), with a respective transformer being connected to a respective electric motor (3, 4).

15. An apparatus for a door drive (1) in accordance with claim 1, wherein at least one electric motor (3, 4) is arranged at the door drive via at least one spring (9), whereby transformer and motor differences and thus an asynchronous operation of the at least two electric motors (3, 4) can be compensated.

16. An apparatus for a door drive (1) in accordance with claim 1, wherein at least two incremental encoders (10) are arranged at the at least two electric motors (3, 4); and a regulation value (12) can be determined by measured values detected by incremental encoders (10) for the regulation of at least one electric motor (3, 4).

17. An apparatus for a door drive (1) in accordance claim 16, wherein a regulation value (12) can be determined by comparison or addition of the measured values of the incremental encoders (10); and at least one electric motor (3, 4) can be regulated by means of the regulation value (12).

18. An apparatus for a door drive (1) in accordance with claim 17, wherein the door drive (1) provides at least one rheostat (14) which is arranged such that the supply voltage is directly variable by the rheostat (14) at least one electric motor (3, 4).

19. An apparatus for a door drive (1) in accordance with claim 1, wherein the door drive (1) provides at least one measurement apparatus (13) for the measurement of an angular position of at least one electric motor (3, 4) and/or of the connection means (5, 6) arranged at the electric motor output; and thereby at least one regulation value (12) can be generated for the regulation of at least one electric motor (3, 4).

20. An apparatus for a door drive (1) in accordance with claim 1, wherein the door drive (1) includes a controller for the evaluation and control of a control variable (8) and/or regulation value (12).

* * * * *